United States Patent [19]
Langlois

[11] 3,934,963
[45] Jan. 27, 1976

[54] AUTOMATIC BALANCING MACHINES

[75] Inventor: Christian Langlois, Billancourt, France

[73] Assignee: Regie Nationale des Usines Renault, Billancourt, France

[22] Filed: Oct. 16, 1973

[21] Appl. No.: 406,934

[30] Foreign Application Priority Data
Nov. 2, 1972 France .................. 72.38988

[52] U.S. Cl. .................. 408/2; 408/12; 408/44; 408/71
[51] Int. Cl.² .................. B27C 9/00; B23B 39/04
[58] Field of Search .......... 269/57; 408/2, 71, 10, 408/12, 44; 73/66, 458, 468, 469, 470, 461; 279/57; 51/232, 61

[56] References Cited
UNITED STATES PATENTS

| | | |
|---|---|---|
| 2,033,686 | 3/1936 | Davis .................. 408/71 |
| 2,779,217 | 1/1957 | Stovall, Jr. et al. .............. 408/12 X |
| 2,807,973 | 10/1957 | Meyer et al. .................. 408/12 X |
| 2,810,307 | 10/1957 | Hack .................. 73/464 X |
| 2,953,069 | 9/1960 | Smith .................. 408/44 |
| 3,024,184 | 3/1962 | Bowes, Jr. et al. .............. 279/57 X |
| 3,385,138 | 5/1968 | Wüsteney et al. .............. 269/57 |
| 3,720,475 | 3/1973 | Leacock .................. 408/71 |

*Primary Examiner*—Travis S. McGehee
*Assistant Examiner*—W. R. Briggs
*Attorney, Agent, or Firm*—Stevens, Davis, Miller & Mosher

[57] ABSTRACT

This automatic machine is intended for machining workpieces in order to reduce their want-of-balance, notably in the case of small or medium series of rotary parts. This machine, adapted to balance dynamically these parts, comprises a measuring station and a plurality of machining stations disposed on a common circle, and a central rotary device having a vertical axis and disposed centrally of said stations for transferring simultaneously all the parts from one station to the next station in the same direction of rotation.

1 Claim, 4 Drawing Figures

AUTOMATIC BALANCING MACHINES

This invention relates in general to the dynamic balancing of rotary parts or workpieces by the method consisting in removing material from these parts, and more particularly to automatic machines for balancing small and medium series of engine crankshafts.

In mass-production processes and more particularly in the motor industry transfer machines have been used for many decades; these machines comprise essentially:

a balancing machine adapted to measure the dynamic want of balance, with its computing units and memory units;

working units for the physical removal of material (such as milling cutters, drilling units); basically, there is one machine per direction in which the material has to be removed, that is, six such machines in the case of a four in-line cylinder engine;

a checking-balancing machine.

Faulty parts are removed from the production line and examined separately.

Now these extremely costly machines are suitable only for mass-production purposes.

In the case of smaller series, a balancing machine comprising a station for measuring and checking the want of balance, and a material-removing station, is used; the change from one station to the other is obtained by using an automatic handling arm. The chief inconvenience of machines of this type lies in the fact that with a single handling arm available it is not possible to treat another part until the preceding workpiece has been checked at the want-of-balance measuring station, then transferred to the material removing station, returned to the want-of-balance measuring station, possibly again to the material removing station for a retouch step, and finally again to the want-of-balance measuring station for a final checking. Obviously, the efficiency of a machine of this character is extremely moderate.

It is the essential object of the present invention to provide an automatic balancing machine which is constructionally simple and suited for operating with small and medium series of workpieces. Furthermore, this machine:

has a relatively high efficiency, since all the working stations, i.e. the want-of-balance measuring stations and material removing stations, operate simultaneously on several workpieces, at a cost corresponding substantially to that of machines designed for operating on small series of parts;

comprises a central rotary device for simultaneously transferring all the workpieces from one station to another, thus minimizing idle periods;

comprises means for automatically pivoting the workpieces whereby the efficiency of each station is constantly maximum to avoid the duplication of such stations;

is capable of automatically finishing workpieces having a want-of-balance beyond the tolerance limits after a first pass, and is easily accessible and maintained.

According to this invention, the automatic machine for dynamically balancing small and medium series of rotary workpieces is remarkable notably in that it comprises a plurality of working stations, namely a measuring station and a plurality of working stations, said stations being disposed on a common circle, and that at the point of convergence of the axes of said stations a central rotary member having a vertical axis is provided for simultaneously transferring all the workpieces to be treated from one station to another, this transfer taking place always in the same direction of rotation.

Other features and advantages of the present invention will appear as the following description proceeds with reference to the attached drawings given by way of example in order to afford a clearer understanding of the invention and of the manner in which the same may be carried out. In the drawings.

Figure 1:
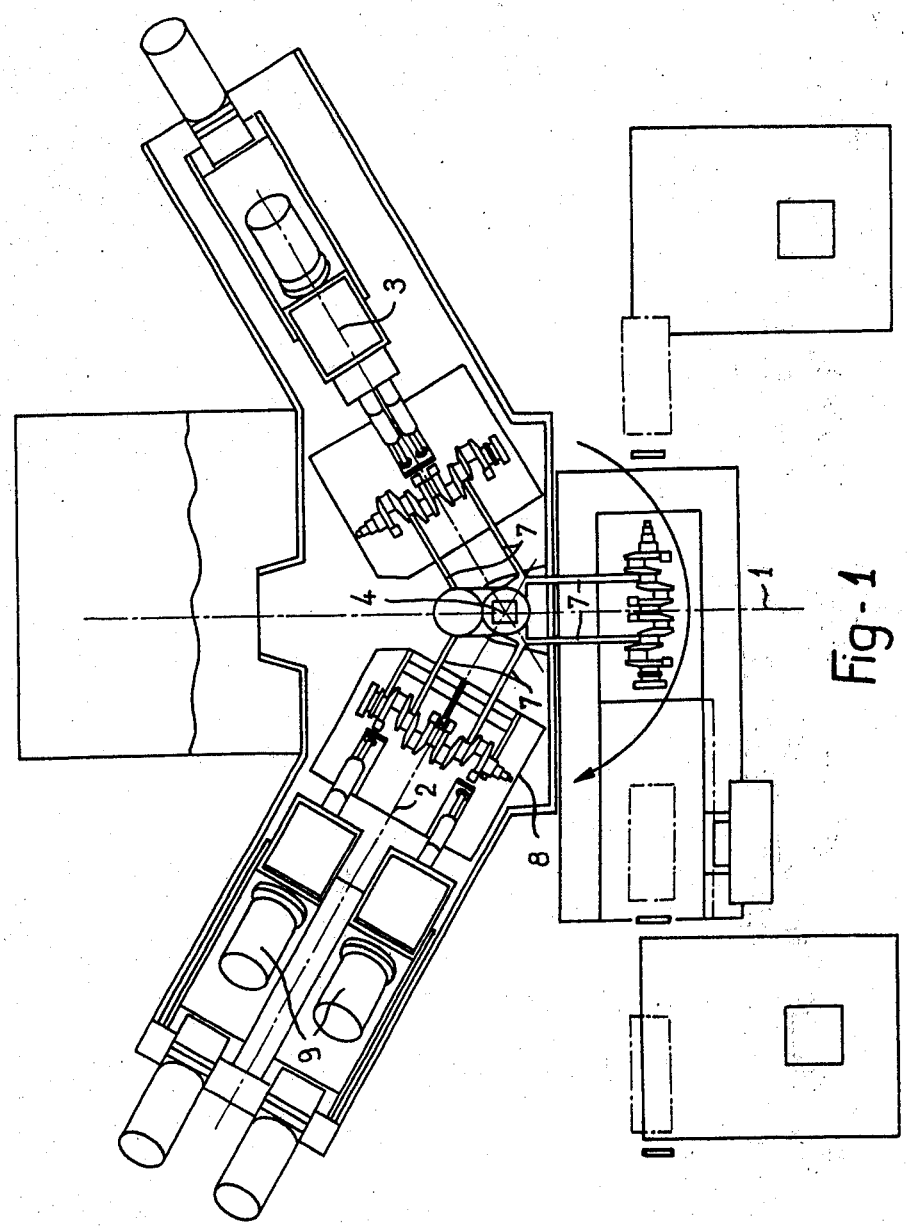
FIG. 1 is a diagrammatic plane view from above of the machine according to this invention.

Referring first to FIG. 1, it will be seen that three geometric converging axes 1, 2 and 3 are coincident with the axes of the three stations of the machine.

At the point of convergence 4 of these three geometric axes a fixed vertical column 5 carries a sleeve 6 provided with three identical radial forks 7 disposed horizontally at a 120° relative spacing. This sleeve 6 mounted for vertical translation and adapted to rotate about its axis (in the clockwise direction as seen in FIG. 1) constitutes the workpiece transfer member.

The first station along the axis 1 is a dynamic balancing machine for measuring:

the want-of-balance of the workpieces (consisting of crankshafts in this example) as they are inserted into the machine, for delivering to an electronic computer unit of a type known per se the data for determining the corrections to be made at the second and third stations;

the want-of-balance after the passage of the workpiece through said second and third correcting stations for:
a. either delivering a signal for permitting the removal of the workpiece from the machine, if the corrections thus made reduced the want-of-balance to values within the prescribed tolerances,
b. or supplying new data to the computer unit in order to control another pass of the workpiece through the correcting stations,
c. or delivering a workpiece rejection signal if the crankshaft want-of-balance values lie outside the prescribed tolerances and cannot be corrected by the machine.

The second station disposed along the axis 2 is adapted to remove material from the endmost balance weights of the crankshaft. This station comprises essentially a pivoting workpieceholder 8 to be described presently, and a pair of standard machining units 9, for drilling or milling, set at an angle of about 30° to the horizontal. The crankshaft laid upon the mounting 8 by the central tranfer unit 6 is locked in a first angular position and the two machining units 9 responsive to the memory of the computer unit remove material from the endmost balance weights in a first direction. Then, after retracting these machining units, the crankshaft is brought by rotation about its axis under the control of automatic means to its second angular position and locked therein. The machining units 9 then remove further material from the endmost balance weights but in a second direction. After another backward movement of the machining units, the central unit is controlled and released for lifting and rotating the three crankshafts through an angle of 120°.

The third station disposed along the axis 3 is adapted to remove material from the pair of central balance weights. Its structure is similar to that of the second station and this third station operates in the same manner as the second station.

Upon completion of the treatment by this third station the workpiece is returned to the first station and measured thereat in the manner already set forth hereinabove.

Figure 3:
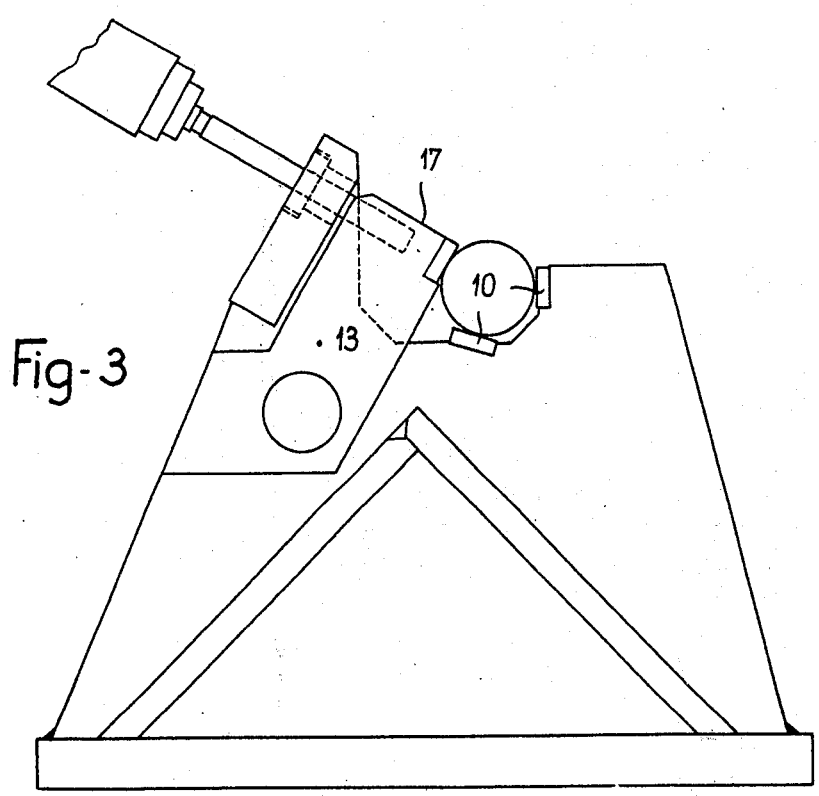
FIGS. 3 and 4 illustrate in detail the manner in which a crankshaft is held in the workpiece holders of the second and third stations of the machine.
Figure 4:
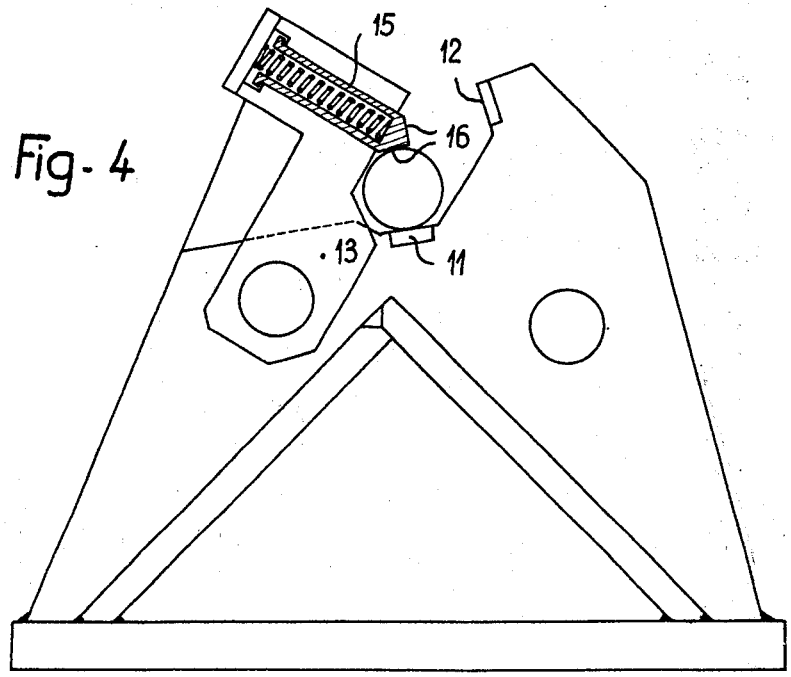

The workpiece holder mountings of the second and third stations are identical except for the crankpin stop members. The crankshaft (FIG. 3) is supported in a horizontal position in these stations by means of its endmost and central bearings in V-shaped supports 10 (the two intermediate journals are held by the transfer fork 7). One of the central crankpins of the crankshaft (FIG. 4) is caused to bear on one side on a first insert 11 of the holder which determines a first angular position of the crankshaft in the mounting, and on the other side on another insert 12 of the holder which determines a second position of the crankshaft in the mounting.

Figure 2:
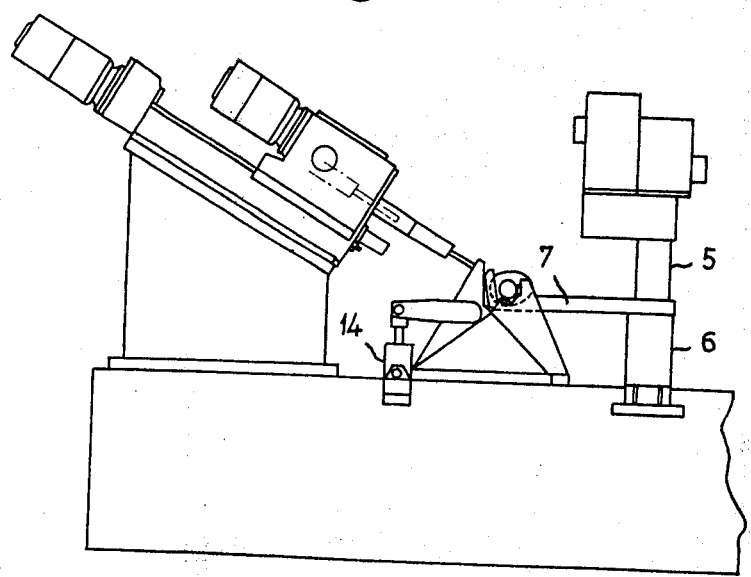
FIG. 2 is a diagrammatic side elevational view of the central transfer member and of a working station.

A mounting bracket 13 (FIGS 3 and 4) responsive to a fluid-actuated cylinder and piston unit 14 (FIG. 2) carries:

a detent-positioning spring-urged piston 15 having a bevelled operative end; the pivotal mounting of the bracket 13, the position of the piston 15 and the bevelled end thereof are so designed that the piston of said bracket urges a central crankpin against the reference insert in each one of the two positions of the crankshaft in the mounting; and in alignment with each one of the three bearing journals, a shoe 17 for locking the crankshaft in position.

These shoes 17 are liable to yield somewhat resiliently so that they can produce a simultaneous locking action.

The crankshaft is pivoted in each mounting by causing the piston rod of a fluid-operated cylinder to exert a thrust against the central crankpin left clear by a notch or other aperture in the bracket 13.

At each station retractable stop members are provided so that when the central tranfer unit 6 is raised or lowered the crankshaft can be pivoted to position same properly.

The above-described machine operates as follows:

the crankshaft is laid upon the first station either manually or automatically, for example by means of a handling clamp adapted to pick up the workpiece from the production line;

at the first station the voltage outputs of a pair of sensors or pick ups are treated electronically and give the corrections to be made by stations 2 and 3; these voltages are memorized;

when the three stations have completed their inherent operations on the workpieces positioned therein, the central transfer unit
  a. lifts the three workpieces while suitable arms responsive to automatic means cause the workpieces to rotate;
  b. rotates bodily through 120°;
  c. lowers the three workpieces while the pivoting arms are again driven automatically to complete the proper positioning of the three crankshafts at the three stations;

at station 2, the workpiece is positioned and locked by the mounting bracket 13, and then machined as a first operation by the two material removing stations, released by pivoting the bracket 13 backwards, pivoted by the piston rod of the fluid-operated thrust cylinder, again positioned and locked in position by pivoting the bracket 13, machined as a second operation by said machining units 9, and again released by lifting the bracket 13;

the central transfer unit, upon receipt of a corresponding signal from the three stations, accomplishes a second transfer movement;

at station 3, the workpiece is treated as in station 2, but the machining operation is performed on the intermediate balance weights of the crankshaft;

the central transfer unit, upon receipt of another signal from the three stations, performs a third transfer movement;

as it returns to the first station 1, the crankshaft is checked again to determine a possible residual want-of-balance, and the value of this possible want-of-balance determines whether:

a. the workpiece is considered as satisfactory and can be removed from the machine; in this case, the workpiece will be removed manually or automatically by means of a clamp associated or not with the feed clamp, and another workpiece is introduced and treated in the machine;

b. the workpiece is to be removed either for final rejection or further finishing in a separate operation; in this case, the same procedure as in the case of a right workpiece will be adhered to;

c. or the workpiece should be re-introduced into the machine for complementary correcting steps; in this case, of course, the workpiece is not replaced by another.

In the case of workpieces to be retouched, the machine according to this invention utilizes the same drills, at the same locations, as during the first passage of the workpiece.

Under these conditions, it is clear that the operator must firstly check if the drill actually contacts the workpiece, whether the latter has been drilled or not in a previous passage. A purely electronic device is obviously not applicable since the drill will contact the workpiece well before reaching the bottom of a hole. The axial thrust exerted by the tool, if of a value lower than that normally exerted during an actual machining operation, will provide the desired result. Thus, for instance, the spindle carrying the drill chuck may recede under a predetermined load and actuate a switch. In case the drill or tool feed movement is accomplished by means of a fluid-actuated cylinder and piston unit, a properly adjusted pressure-responsive switch will provide the desired function.

Then, the distance from the tip of the drill to the workpiece axis must be determined at the contact time. To do this it is only necessary to associate means for measuring this distance with the tool movement. A high degree of precision is not required for this measuring device which may be separate from or combined with the means for measuring the depth of penetration of the drill during the machining operation. Any suitable sensor or pick up, for example of numeric, digital, potentiometric or other type, may be used.

The signal delivered by the contact detector will permit picking up the value read on the position sensor. This value is memorized and subsequently utilized in the computer unit, according to methods well known to those conversant with the art, for determining the drilling depth necessary for a satisfactory retouch.

The embodiment proposed herein of the machine according to the present invention is intended for balancing the crankshafts of engines having four cylinders in line, but of course this is only a preferred example since various other workpieces may be treated according to the principle of this invention.

Various modifications may therefore be brought to this specific form of embodiment, notably:

simulating the presence of the connecting-rods (for example in the case of V-engines; ;

machining at one station in one, two or three series of directions, and providing corresponding mounting permitting one, two or three positions, respectively, of the workpiece;

providing one, two or three machining stations, the relative angular spacing of these stations, corresponding to the transfer angle, being modified accordingly.

The central transfer unit of the machine ensures an orderly, simultaneous and particularly fast transfer of the workpieces.

From the foregoing it is clear that the essential objects of the machine according to this invention are achieved:

all the stations operate simultaneously on different workpieces;

the simultaneous transfer of all the workpieces is particularly simple and rapid;

the working possibilities of the various stations are fully exploited, this applying both to the machining stations, by virtue of the mounting adapted to present the workpiece to the various units in succession in different angular positions, and to the measuring station in which the workpieces are checked subsequent to the balancing operation;

all operations are performed automatically, including the possible retouch of workpieces;

the access to the various component elements is extremely easy and therefore the maintenance work is greatly facilitated.

Finally, it will be noted that the machine, although described hereinabove with specific reference to the balancing of crankshafts of all thermal engines in small or medium series, can be adapted to balancing other types of rotary parts such as rotors of electric motors and generators, compressors, pumps, etc..

In this spirit and although a specific form of embodiment of this invention has been described hereinabove and illustrated in the accompanying drawing, it will readily occur to those skilled in the art that various modifications and changes may be brought thereto without departing from the scope of the invention as set forth in the appended claims.

I claim:
1. Automatic machine for balancing the rotary crankshaft of thermal engines comprising
   a measuring station and machining stations disposed circumferentially equal distances apart on a common circle;
   a rotary unit, said rotary unit having a work holding fork for each station extending radially from said rotary unit toward each station;
   said forks being spaced equal circumferential distances apart;
   means to rotate said rotary unit to angularly displace said forks from one station to another in the same direction of rotation and to move said fork vertically to receive the rotary crankshaft and to deliver said crankshafts to supports at said stations;
   said machining stations having crankshaft supports comprising V-shaped members for receiving and centering the journals of said crankshafts, together with inserts for engaging and positioning a central crankpin, and
   a bracket adapted to be operated automatically by a fluid-actuated cylinder and piston unit, said bracket further comprising shoes for clamping journals normally to said V-shaped members and a bevelled spring-urged piston end for pressing the reference crankpin against one of the positioning inserts to angularly orientate the crankshaft in the mounting.

* * * * *